United States Patent
Kinlen et al.

(10) Patent No.: US 9,696,189 B2
(45) Date of Patent: Jul. 4, 2017

(54) DEVICE AND METHOD FOR DETERMINING FLUID STREAMING POTENTIAL

(71) Applicant: The Boeing Company, Chicago, IL (US)

(72) Inventors: Patrick J. Kinlen, Seattle, WA (US); Ofer Alves, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 315 days.

(21) Appl. No.: 14/100,910

(22) Filed: Dec. 9, 2013

(65) Prior Publication Data

US 2015/0068322 A1 Mar. 12, 2015

Related U.S. Application Data

(60) Provisional application No. 61/874,467, filed on Sep. 6, 2013.

(51) Int. Cl.
*G01F 1/64* (2006.01)

(52) U.S. Cl.
CPC .................. *G01F 1/64* (2013.01)

(58) Field of Classification Search
CPC ......... G01N 33/343; G01N 27/60; G01F 1/64
USPC .............. 324/713, 71.1; 73/861.08, 61.73
See application file for complete search history.

(56) References Cited

U.S. PATENT DOCUMENTS

| | | | | |
|---|---|---|---|---|
| 3,496,762 A * | 2/1970 | Gaeta | ...................... | G01N 11/02 73/54.01 |
| 8,162,044 B2 * | 4/2012 | Sihler | ...................... | E21B 4/02 166/105 |
| 2002/0129652 A1 * | 9/2002 | Aigner | ................... | G01C 19/56 73/514.16 |
| 2008/0309316 A1 * | 12/2008 | Forgacs | ................. | G01N 27/08 324/71.1 |

FOREIGN PATENT DOCUMENTS

| | | | | |
|---|---|---|---|---|
| AU | WO 9945344 A1 * | 9/1999 | ............... | G01F 1/56 |
| DE | EP 2034300 A1 * | 3/2009 | ............. | G01N 27/60 |
| EP | 2034300 A1 | 3/2009 | | |

(Continued)

OTHER PUBLICATIONS

Mornhinweg et al, EP 2034300, "Device for measuring a streaming potential." (English Machine Translation, Published Mar. 11, 2009).*

(Continued)

*Primary Examiner* — Melissa Koval
*Assistant Examiner* — Felicia Farrow
(74) *Attorney, Agent, or Firm* — Christopher R. Carroll; The Small Patent Law Group, LLC

(57) ABSTRACT

A method (e.g., for characterizing a fluid) includes rotating an electrode assembly in a fluid at a rotation speed. The electrode assembly includes first and second electrodes. Rotation of the electrode assembly draws at least a portion of the fluid to move across the first and second electrodes. The method also includes measuring a potential difference between the first and second electrodes as the at least a portion of the fluid moves across the first and second electrodes due to rotation of the electrode assembly, and determining a streaming potential of the fluid using the potential difference.

20 Claims, 6 Drawing Sheets

(56) References Cited

FOREIGN PATENT DOCUMENTS

| GB | WO 2006072795 A1 | * | 7/2006 | ............ | C25B 9/125 |
| NL | WO 2005103673 A1 | * | 11/2005 | ............ | G01N 27/60 |
| WO | 9945344 A1 | | 9/1999 | | |
| WO | 2005103673 A1 | | 11/2005 | | |
| WO | 2006072795 A1 | | 7/2006 | | |

OTHER PUBLICATIONS

James D. Hoggard et al, "Measurement of the Streaming Potential and Streaming Current near a Rotating Disk to Determine Its Zeta Potential", May 27, 2005, 6 pages.

Paul J. Sides et al, "Calculation of the Streaming Potential near a Rotating Disk" 2006, Langmuir, vol. 22, No. 23, 5 pages, American Chemical Society, Published on Web Oct. 7, 2006.

* cited by examiner

DEVICE AND METHOD FOR DETERMINING FLUID STREAMING POTENTIAL

CROSS-REFERENCE TO RELATED APPLICATION

This application claims priority to U.S. Provisional Application No. 61/874,467, which was filed on 6 Sep. 2013, and the entire disclosure of which is incorporated by reference.

FIELD

This disclosure relates to devices and methods for determining fluid streaming potential.

BACKGROUND

Rotating disk electrodes (RDE) are conventionally used in characterizing electrochemistry in chemical reactions, such as in redox reactions. One current device for attempting to determine the streaming potential of aqueous solutions is a rotating disk and a very small stationary silver chloride reference electrode. The function of this device is limited to being used in aqueous solutions containing chloride ions, as these very small silver chloride reference electrodes do not function in organic fluids without chloride ions. As a result, this device may not be useful for measuring a streaming potential of a non-aqueous solution, such as hydraulic fluid.

Another device for attempting to determine the streaming potential of a fluid uses two small silver chloride electrodes in a flow cell. A relatively large amount of the fluid is pumped through the flow cell and the potential difference between these electrodes is measured to characterize the streaming potential of the fluid. This device is relatively large, cumbersome, prone to leaking, and can require relatively high pressure flow of the fluid.

A system and method is needed to overcome one or more of the limitations experienced by one or more of the existing devices or methods for determining the streaming potential of a fluid.

BRIEF DESCRIPTION

In one aspect, a method for testing a fluid is disclosed. A rotating device is rotated in a fluid to cause the fluid to move across the rotating device. A voltage of the fluid is measured at a plurality of locations of the rotating device as the fluid moves across the rotating device. A streaming potential of the fluid is determined based on a difference in the measured voltage of the fluid at the plurality of the locations of the rotating device.

In another aspect, another method for testing a fluid is disclosed. A rotating ring-disk electrode is rotated in a fluid at different rotation rates to cause the fluid to move across the rotating ring-disk electrode. A streaming potential of the fluid is determined at each of the different rotation rates based on a difference in measured voltage of the fluid at a plurality of locations of the rotating ring-disk electrode as the fluid moves across the rotating-ring disk electrode at each of the different rotation rates. The rotating ring-disk electrode is rotated in a different fluid at the different rotation rates to cause the different fluid to move across the rotating ring-disk electrode. The streaming potential of the different fluid is determined at each of the different rotation rates based on the difference in the measured voltage of the different fluid at the plurality of the locations of the rotating ring-disk electrode as the fluid moves across the rotating-ring disk electrode at each of the different rotation rates. The fluid or the different fluid which has the lowest determined streaming potential at the highest revolution per minute rate is selected as the fluid to be less prone to generating streaming potentials.

In still another aspect, a system for determining a streaming potential of a fluid is disclosed. The system includes a rotating device, a control device, a motor, and a voltmeter. The motor is connected to the rotating device. The motor is configured to rotate the rotating device in a fluid at different rotation rates as controlled by the control device to move the fluid across the rotating device. The voltmeter is connected to a plurality of locations of the rotating device. The voltmeter is configured to measure a voltage of the fluid at the plurality of locations of the rotating device as the fluid moves across the rotating device in order to determine a streaming potential of the fluid based on a difference in the measured voltage of the fluid at the plurality of the locations of the rotating device.

In another aspect, different materials may be used to form the electrodes. For example, one electrode could be formed from a first metal or metal alloy while the other electrode formed from a different, second metal or metal alloy. The different metals or metal alloys may generate different streaming potentials when rotated within the same fluid. The same fluid may be examined using different combinations of metals or metal alloys in the electrodes in order to determine different streaming potentials generated in the fluid as a function of fluid velocity.

In one embodiment, a method (e.g., for characterizing a fluid) includes rotating an electrode assembly in a fluid at a rotation speed. The electrode assembly includes first and second electrodes. Rotation of the electrode assembly draws at least a portion of the fluid to move across the first and second electrodes. The method also includes measuring a potential difference between the first and second electrodes as the at least a portion of the fluid moves across the first and second electrodes due to rotation of the electrode assembly, and determining a streaming potential of the fluid using the potential difference.

In one embodiment, a system (e.g., a measurement system for a fluid) includes an electrode assembly, an actuation device, and an electric energy sensing device. The electrode assembly includes a first electrode and a second electrode separated from each other by an insulative gap. The actuation device is configured to be coupled with the electrode assembly to rotate the electrode assembly in a fluid under examination. The electric energy sensing device is configured to be conductively coupled with the first and second electrodes of the electrode assembly. The electric energy sensing device also is configured to measure a potential difference between the first and second electrodes as the actuation device rotates the electrode assembly at a rotation speed to cause the fluid to move across the first and second electrodes. The potential difference that is measured is representative of a streaming potential of the fluid.

In one embodiment, a method (e.g., for examining a fluid) includes at least partially submerging first and second electrodes in a fluid. The first and second electrodes are separated from each other by an insulative gap. The method also includes rotating the first and second electrodes in the fluid at a common rotation speed. Rotation of the first and second electrodes at the common rotation speed causes the fluid to move across the first and second electrodes at a radial fluid velocity. The method also includes measuring a potential difference between the first and second electrodes as the fluid moves across the first and second electrodes at the radial fluid velocity, and determining a streaming potential of the fluid as a function of fluid velocity using the potential difference and the radial fluid velocity.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
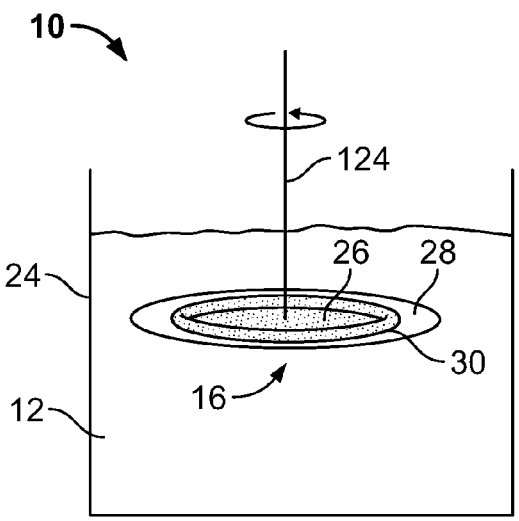
FIG. 1 is a schematic diagram of a measurement system for determining a streaming potential of a fluid as a function of fluid velocity.

FIG. 1 is a schematic diagram of a measurement system 10 for determining a streaming potential of a fluid 12 as a function of fluid velocity. The system 10 includes an electrode assembly 16 that is at least partially positioned in a container 24 having the fluid 12 disposed therein. The electrode assembly 16 also may be referred to as a rotating device.

The amount of fluid 12 included in the container 24 may be relatively small, such as in the tens of milliliters. For example, the container 24 may be a laboratory beaker capable of holding one hundred or so milliliters of a liquid. The fluid 12 may be an aqueous liquid, such as a water-based fluid. In one aspect, the fluid 12 is a non-electrolyte solution, such as a liquid that does not include a salt dissolved in a solvent. Alternatively, the fluid 12 may include a non-aqueous liquid, an electrolyte solution, hydraulic fluid, or another fluid.

For example, one embodiment of the system 10 and method of using the system 10 disclosed herein differs from conventional electrochemical analytic systems that measure streaming potentials of fluids in that these conventional systems may require use of electrolytic solutions that are conductive or highly conductive. These conventional systems may involve the use of electrolytic solutions having conductivities of about 0.1 microSiemens per centimeter (µS/cm) to about 150.0 microSiemens per centimeter (µS/cm). These conductivities can interfere with electrochemical analysis. For comparison purposes only, ultra-pure water has a conductivity of about 0.055 µS/cm, as a reference. High concentrations of electrolytes, e.g., molar concentrations of about 0.1 to 0.5, provides conductivity to a fluid or solution, and enables control of over the potential of the disk and ring. Eliminating high molar concentrations of electrolytes in the fluid 12 (as can be done with the system 10) prevents the application of known systems and methods to organic fluids, including fluids having conductivity of at least 0.1 µS/cm. Low electrolyte concentrations (e.g., 1 mM or less), similarly does not work for fluids lacking chloride ions and is further unsuitable for organic or other hydrocarbon-based fluids.

The electrode assembly 16 includes plural electrodes 26, 28 that are used to measure a difference between the potential (e.g., voltage) that is induced on the electrodes 26, 28 when the fluid 12 moves relative to the electrodes 26, 28. In one aspect, the electrode 26 is a disk-shaped electrode and the electrode 28 is a ring-shaped electrode, with the disk-shaped electrode disposed inside of the ring-shaped electrode. The electrode 28 may extend around an entirety of the outer perimeter of the electrode 26. Alternatively, the electrode 28 may extend around less than the entire outer perimeter of the electrode 26. The electrode 26 may be referred to as an inner electrode and the electrode 28 may be referred to as an outer electrode.

The electrodes 26, 28 are separated from each other by an insulative gap 122. This insulative gap 122 represents a non-conductive spatial separation between the electrodes 26, 28. In one aspect, the insulative gap 122 may include an insulating ring-shaped member 30 coupled with the electrodes 26, 28 and formed from a non-conductive (e.g., dielectric) material. Optionally, the insulative gap 122 may be formed by spatial separation between the electrodes 26, 28 without another body disposed in the insulative gap 122. The insulative gap 122 prevents a conductive pathway from being formed between the electrodes 26, 28 in the electrode assembly 16. As a result, the electric potential (e.g., voltage) that is induced on the electrode 26 can be separately measured from the electric potential induced on the other electrode 28 when the fluid 12 is moving relative to the electrodes 26, 28.

In one aspect, the electrodes 26, 28 are rotated together within the fluid 12 to cause the fluid 12 to move past (e.g., flow across) the electrodes 26, 28. The electrodes 26, 28 may be coupled with each other and to a shaft 124 of the system 10. The shaft 124 can be rotated to cause the electrodes 26, 28 to rotate at the same speed. For example, the electrodes 26, 28 may be coupled with each other, coupled with the same shaft 124, or both coupled with each other and with the shaft 124 such that rotation of the shaft 124 or one of the electrodes 26 or 28 causes both of the electrodes 26, 28 to simultaneously rotate at the same rotation speed. While the outer electrode 28 may have a greater angular velocity than the inner electrode 26 due to the outer electrode 28 being radially disposed farther from the shaft 124 than the inner electrode 26, the speeds at which the electrodes 26, 28 are rotating about (e.g., around) the shaft 124 may be equivalent.

Figure 2:
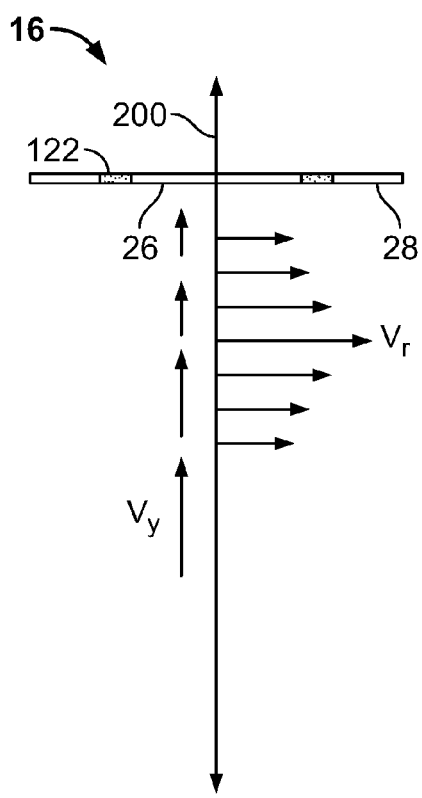
FIG. 2 schematically illustrates an example of flow of the fluid when electrodes of an electrode assembly in the system shown in FIG. 1 are rotated in the fluid.
Figure 3:
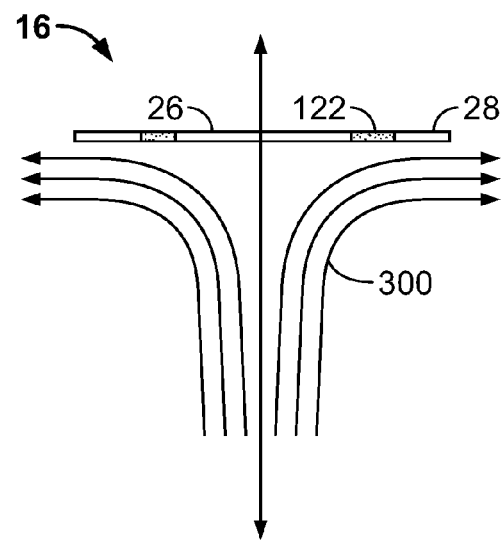
FIG. 3 also schematically illustrates an example of flow of the fluid shown in FIG. 2.

With continued reference to the electrode assembly 16 shown in FIG. 1, FIGS. 2 and 3 schematically illustrate an example of flow of the fluid 12 when the electrodes 26, 28 in the system 10 are rotated in the fluid 12. FIG. 2 illustrates velocity vectors ($v_y$ and $v_r$) of the fluid 12, while FIG. 3 illustrates flow paths 300 of the fluid 12 (e.g., the paths along which the fluid 12 flows).

The electrodes 26, 28 may be coaxially aligned such that the electrodes 26, 28 rotate about (e.g., around) a common axis 200 (which also can represent the axis of rotation of the electrodes 26, 28). As the electrodes 26, 28 rotate, the fluid 12 is drawn upward in the container 24 (shown in FIG. 1)

toward the electrodes 26, 28 at a vertical fluid velocity ($v_y$). The fluid 12 that is drawn toward the electrodes 26, 28 also flows radially outward away from the common axis 200 at a radial velocity ($v_r$), as shown by the flow paths 300 in FIG. 3. Movement of the fluid 12 by the electrodes 26, 28 can induce an electric charge (e.g., voltage) on the electrodes 26, 28. For example, as the fluid 12 moves across the electrodes 26, 28, negatively charged ions, particles, or both ions can be swept away from surfaces of the electrodes 26, 28 by the fluid 12. To balance this movement of charge, electrons in the electrodes 26, 28 may flow in an opposite direction and create an electronic potential (e.g., voltage) at the electrodes 26, 28.

The difference in these potentials is referred to as a streaming potential of the fluid 12. The streaming potential can be represented by the following relationship:

$$X = \left[\frac{\Psi_0 \varepsilon}{4\pi\eta\sigma}\right]\Delta P$$

where X represents a gradient of the streaming potential of the fluid 12, $\Psi_0$ represents a potential the an outer Helmholtz plane (OHP) between the fluid 12 and the electrodes 26, 28, $\in$ represents the dielectric constant of the fluid 12, $\eta$ represents the fluid viscosity of the fluid 12, $\sigma$ represents the fluid conductivity of the fluid 12, and $\Delta P$ represents the differential pressure in the fluid 12.

In one aspect of the inventive subject matter described herein, the streaming potential can be measured for the fluid 12 as a function of fluid velocity. Streaming potentials for fluids 12 can be examined as a function of fluid velocity (e.g., the radial velocity $v_r$ of the fluid flow) in order to characterize the fluids 12. This fluid velocity can represent the rate at which the fluid 12 is moving across or parallel to the surfaces of the electrodes 26, 28 that are facing the fluid 12 (e.g., facing in a downward direction in the perspective of FIG. 1). The streaming potentials for different fluids 12 can be measured in order to determine which fluid 12 may be less prone to cause contamination, corrosion, or the like, when the fluid 12 is used as a hydraulic fluid in a machine. Fluids 12 having smaller streaming potentials may be less likely to contribute to contamination, corrosion, or the like, when compared to fluids 12 having larger streaming potentials. Additionally or alternatively, the streaming potential for a fluid 12 in a machine (e.g., a hydraulic or other fluid) can be measured, monitored over time, or both in order to determine when to replace the fluid 12. Over time, the streaming potential of fluid 12 in a machine may change. A changing streaming potential can indicate a change in the chemistry of the fluid and a corresponding need to change or replace the fluid 12.

By putting different fluids 12 in the container 24 and measuring the streaming potentials of the fluids 12 as a function of fluid velocity (e.g., radial velocity $v_r$), the system 10 may be used to measure the streaming potentials of different fluids 12 at different rotation rates of the electrodes 26, 28. The fluid 12 which has the lowest determined streaming potential at the highest revolution per minute rate may then be selected for use in a fluidic system, such as a hydraulic system, in one embodiment. Optionally, fluids 12 with streaming potentials below a designated threshold at fluid velocities in which the fluids 12 move in the machines may be selected. In other aspects, the selected fluid 12 may be used in varying devices or for further evaluation or modification.

As one example, the electrodes 26, 28 may be rotated at a designated rotation speed (e.g., as expressed in terms of revolutions, radians, degrees per unit time, such as per minute, or as otherwise expressed) and the voltages sensed by each of the electrodes 26, 28 are measured. A difference between these voltages may be calculated as the streaming potential of the fluid 12 at the rotation speed of the electrodes 26, 28. The rotation speed of the electrodes 26, 28 can be converted into the speed at which the fluid 12 is flowing across or parallel to the electrodes 26, 28. The calculated streaming potential may then be associated with the fluid velocity (e.g., the radial velocity $v_r$) for this fluid 12. In one aspect, the rotation speed of the electrodes 26, 28 can be converted into the fluid velocity using the following relationship:

$$v_r = 0.51\left[\omega\frac{2}{3}\right][v^{-0.5}]ry$$

where $v_r$ represents the radial velocity, $\omega$ represents the rotation speed of the electrodes 26, 28 (e.g., in terms of radians per second), v represents the kinematic viscosity of the fluid 12, r represents the radius electrodes 26, 28 at which the fluid velocity is being calculated, and y represents a distance from the surfaces of the electrodes 26, 28 that face the moving fluid 12 (e.g., that faces downward in the view of FIG. 1). The radial velocity of the fluid 12 may be expressed as a function of radius, or distance from the axis 200 that the electrodes 26, 28 rotate around. For example, for a designated rotation speed ($\omega$) of the electrodes 26, 28, the radial velocity ($v_r$) of the fluid 12 may be different at different distances away from the axis 200. Therefore, several radial velocities may be measured for the fluid 12 in one embodiment. Alternatively, the streaming potential of the fluid 12 may be measured and associated with the rotation speed of the electrodes 26, 28 instead of the radial velocity of the fluid 12.

Figure 4:
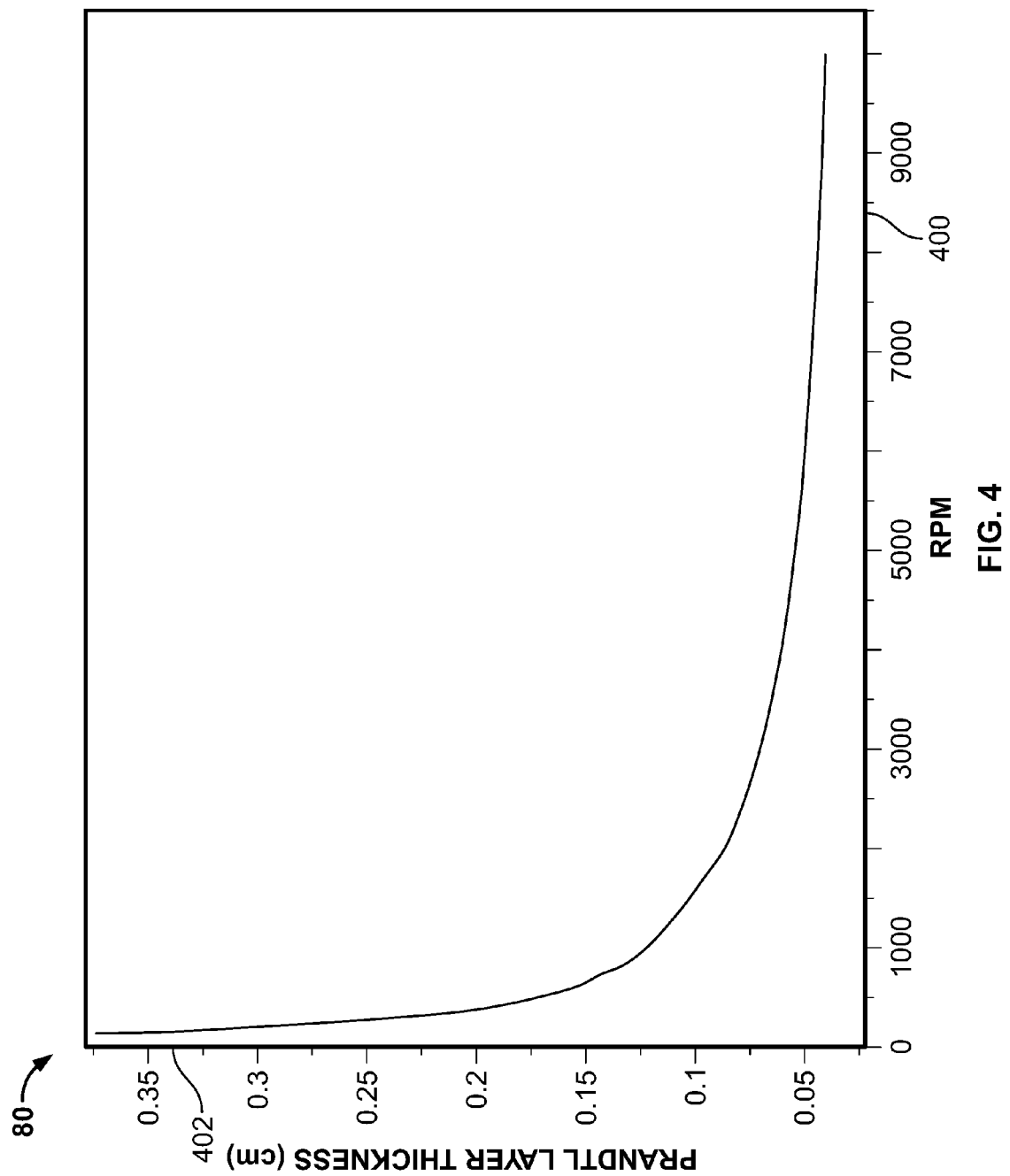
FIG. 4 illustrates a graph showing the Prandtl numbers of the fluid at different rotation speeds of the electrodes shown in FIG. 1 according to one example.

The radial velocity of the fluid 12 that is calculated may represent the radial velocity of a portion of the fluid 12 that is located relatively close to the ends or surfaces of the electrodes 26, 28 that face the moving fluid 12 (e.g., the surfaces facing in a downward direction in the perspective of FIG. 4). For example, the rotation of the electrodes 26, 28 can drag a fluid layer of the fluid 12 that constitutes less than all of the fluid 12 in the container 26. The radial velocity of the fluid 12 can represent the speed at which this fluid layer is moving outward from the common axis 200 of the electrodes 26, 28. The fluid layer can be referred to as a hydrodynamic boundary layer of the fluid 12, and the thickness of this fluid layer (e.g., as measured in distances from the surfaces of the electrodes 26, 28 in directions that are oriented parallel to the common axis 200) can be referred to as a Prandtl number of the fluid 12.

The Prandtl number may depend on the kinematic viscosity of the fluid 12 and the rotation speed ($\omega$) of the electrodes 26, 28. In one example, the Prandtl number of the fluid 12 is represented by the following relationship:

$$y_h = 3.6\left(\frac{v}{\omega}\right)^{\frac{1}{2}}$$

where $y_h$ represents the Prandtl number of the fluid 12 (e.g., the thickness of the boundary layer of the fluid 12 that is moving across the electrodes 26, 28), v represents the kinematic viscosity of the fluid 12, and ω represents the rotation speed of the electrodes 26, 28 (e.g., in terms of radians per second). Alternatively, the thickness of the boundary layer may be measured or calculated in another manner.

FIG. 4 illustrates a graph 800 showing the Prandtl numbers of the fluid 12 (e.g., the thicknesses of a boundary layer of the fluid 12 that is dragged by the rotating electrodes 26, 28) at different rotation speeds of the electrodes 26, 28 according to one example. The Prandtl numbers are shown alongside a horizontal axis 400 representative of rotation speeds of the electrodes 26, 28 (expressed in terms of revolutions per minute, or RPMs) and a vertical axis 402 representative of the Prandtl number (e.g., the thickness of the boundary layer of fluid 12, expressed in terms of centimeters). As shown in FIG. 4, the thickness of the boundary layer of the fluid 12 is larger at slower rotation speeds of the electrodes 26, 28, and decreases as the rotation speeds increase.

Figure 5:
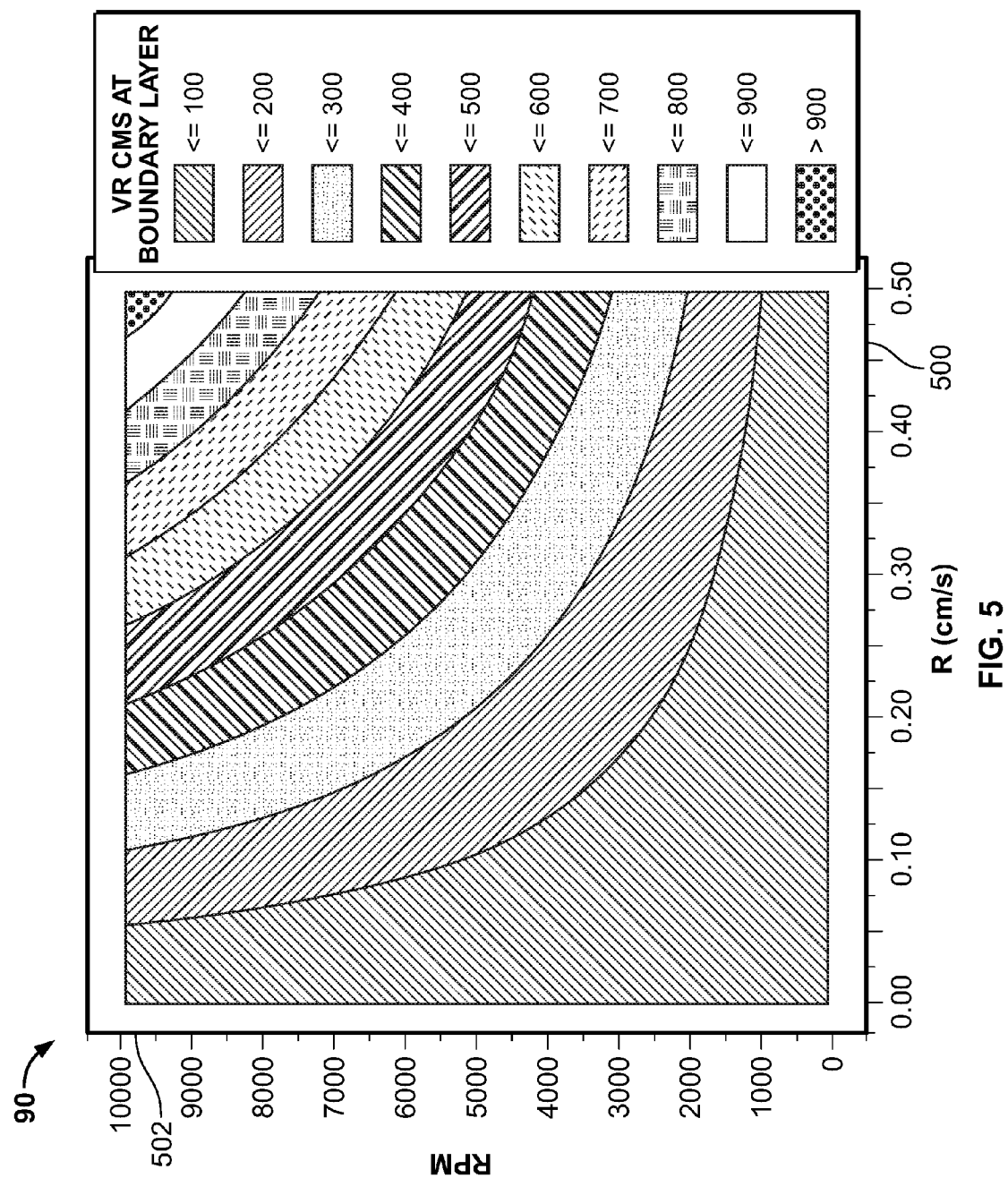
FIG. 5 illustrates a graph showing radial velocities (vr) of a boundary layer of the fluid at different rotation rates of the electrodes shown in FIG. 1 in accordance with one example.

FIG. 5 illustrates a graph 90 showing radial velocities ($v_r$) of a boundary layer of the fluid 12 at different rotation rates of the electrodes 26, 28 in accordance with one example. The radial velocities are shown alongside a horizontal axis 500 representative of radial velocity (expressed in terms of centimeters per second) and a vertical axis 502 representative of rotation speed of the electrodes 26, 28 (expressed in terms of revolutions per minute, or RPMs). As shown in FIG. 4, the radial velocity of the boundary layer of the fluid 12 is slower at distances that are closer to the common axis 200 of the electrodes 26, 28 (as shown in FIG. 2), at slower rotation speeds of the electrodes 26, 28, and at both smaller distances from the common axis 200 and at slower rotation speeds. Conversely, when the radial distance (e.g., radius) from the common axis 200 increases (e.g., the location where the radial velocity is calculated for), the rotation speed of the electrodes 26, 28 increases, or both the radial distance and the rotation speed increase, then the radial velocities increase.

There may be a high variation of the radial velocity at the boundary layer of the fluid 12 from the center of the disk-shaped electrode 26 to the ring-shaped electrode 28 as a function of rotation rates. For example, at 1,000 revolutions per minute of the electrodes 26, 28, the radial velocity changes insignificantly from the center of the disk-shaped electrode 26 (e.g., the common axis 200) to the ring-shaped electrode 28. At 5,000 revolutions per minute, the radial velocity changes less than 100 cm/s to 500 cm/s from the center of the disk-shaped electrode 26 to the ring-shaped electrode 28. A more dramatic change in radial velocity occurs at 10,000 revolutions per minute of the electrodes 26, 28, where the radial velocity changes from about 100 cm/s to greater than 900 cm/s from the center of the disk-shaped electrode 26 to the ring-shaped electrode 28. This acceleration in the flow of the fluid 12 provides increased streaming potential attainable using the rotating electrodes 26, 28 as measured by the potential difference between the disk-shaped electrode 26 and the ring-shaped electrode 28.

As described above, the streaming potentials for different fluids 12 may be measured at different rotation speeds of the electrodes 26, 28 in order to calculate the streaming potentials of the fluids 12 as a function of the radial velocity at which the fluid 12 is moving across the electrodes 26, 28. One or more of these fluids 12 may be selected for use in a machine based on a comparison of these streaming potentials. For example, the fluid 12 having a lower streaming potential than one or more other fluids 12 at radial velocities that are equal to or relatively close to the speeds at which the fluid 12 is expected to move in the machine (e.g., within 90% to 110% of the speed at which the fluid 12 moves in the machine) may be selected for use in the machine (e.g., as hydraulic fluid).

Additionally or alternatively, relatively small samples (e.g., in the tens of milliliters or less) of the fluid 12 being currently used in a machine may be extracted from the machine (e.g., when the machine is deactivated) and the streaming potentials for the fluid 12 may be measured at one or more designated radial velocities (e.g., the radial velocities that are equal to or approximately the same as the speeds at which the fluid 12 flows in the machine). The streaming potentials may be compared to one or more thresholds to determine if the streaming potentials indicate that the fluid 12 may need to be at least partially replaced or entirely replaced. For example, over time, the streaming potential of the fluid 12 may change (e.g., increase or decrease) such that the fluid 12 may be more prone to contamination or corrosion of the machine.

Figure 6:
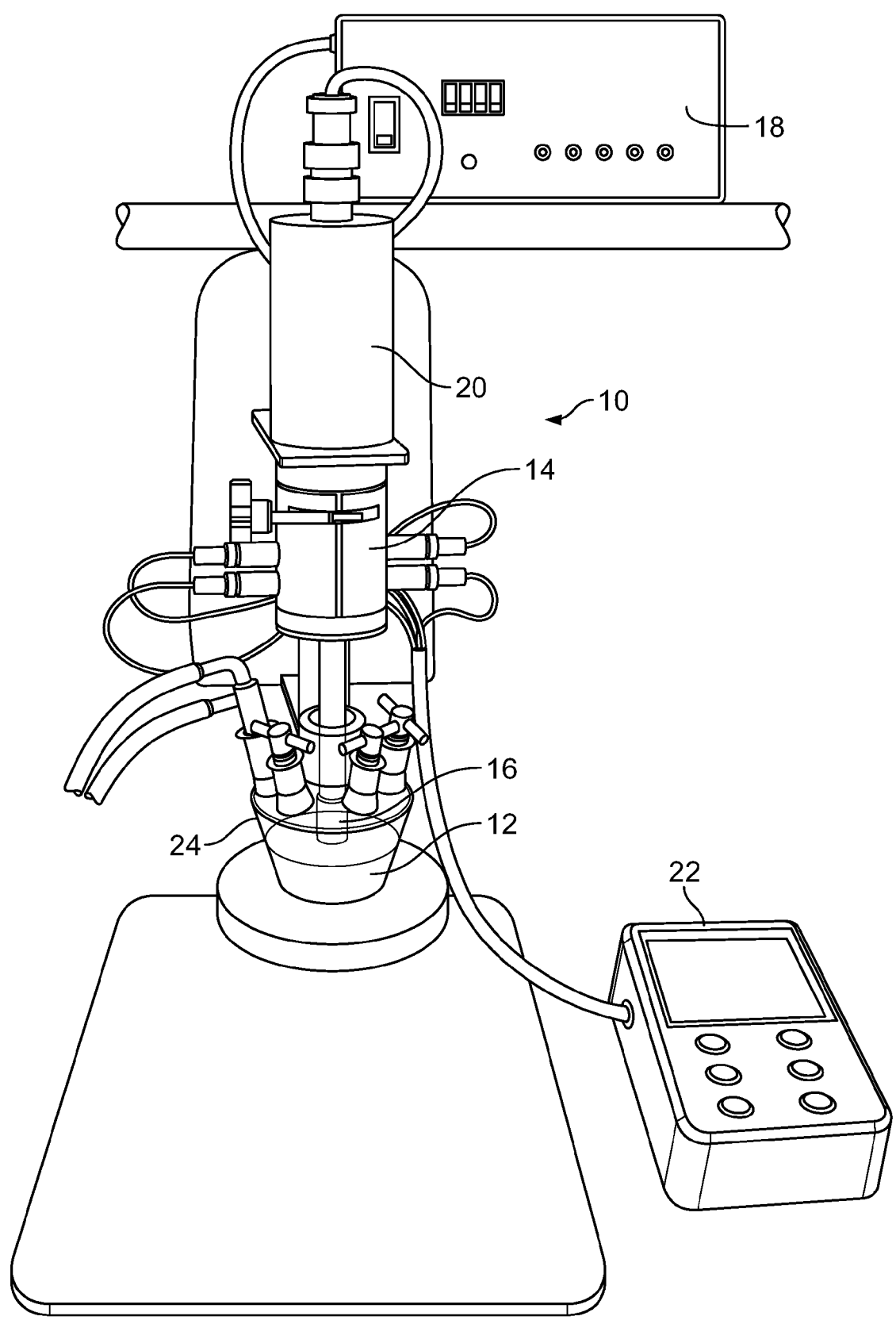
FIG. 6 illustrates a perspective view of one embodiment of the measurement system.

FIG. 6 illustrates a perspective view of one embodiment of the measurement system 10. In addition to the electrode assembly 16, the system 10 may include a moveable frame 14 mechanically coupled to the electrode assembly 16 and a control device 18. The moveable frame 14 can move relative to the container 24, such as by moving upward, downward, or both upward and downward in the view of FIG. 6. The moveable frame 14 can be used to raise the electrode assembly 16 out of the fluid 12 in the container 24 and/or lower the electrode assembly 16 down into the fluid 12 in the container 24. The moveable frame 14 also allows the rotating device 16 to rotate while partially disposed in the fluid 12 held within the container 24. For example, the rotating device 16 may be coupled with an actuation device 20, such as a motor, by the moveable frame 14 and/or by one or more other components (e.g., gears, rods, or the like). The actuation device 20 can rotate the rotating device 16 such that the electrodes 26, 28 (shown in FIG. 1) rotate with in the fluid 12 in the container 24, as described above.

Figure 7:
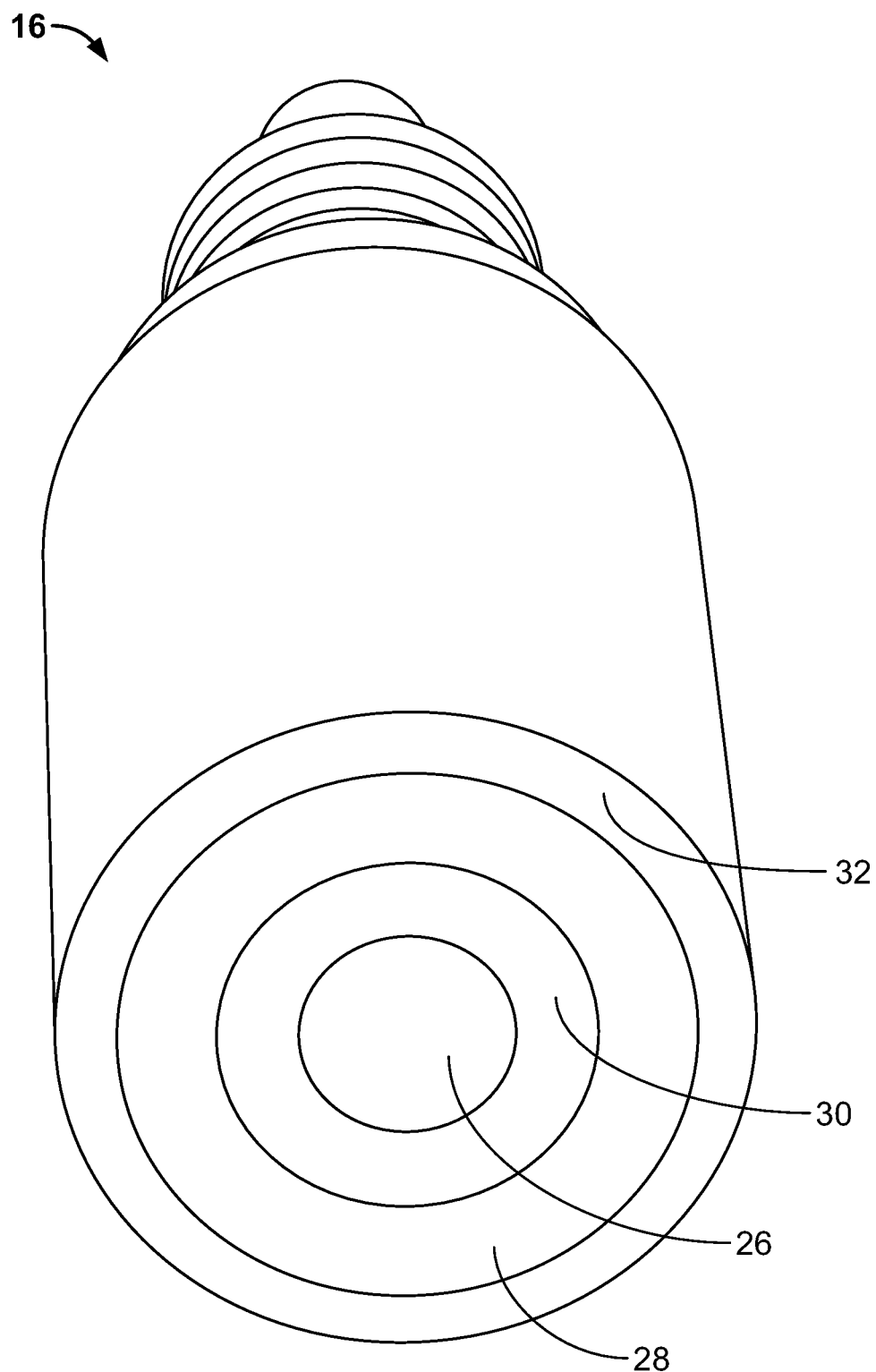
FIG. 7 illustrates a perspective view of a rotating device or electrode assembly shown in FIG. 1 according to one embodiment.

With continued reference to the embodiment of the system 10 shown in FIG. 6, FIG. 7 illustrates a perspective view of the rotating device 16 (e.g., the electrode assembly) according to one embodiment. The rotating device 16 comprises a rotating ring-disk electrode (RRDE) that includes the disk-shaped inner electrode 26, the ring-shaped outer electrode 28, an inner insulating ring-shaped member or body 30, and an outer insulating ring-shaped member or body 32. The inner insulating ring-shaped member 30 is disposed in-between and against an outer diameter of the disk-shaped inner electrode 26 and an inner diameter of the ring-shaped outer electrode 28. The inner insulating ring-shaped member 30 includes or is formed from a dielectric material that prevents conduction of electric current through the member 30 from the inner electrode 26 to the outer electrode 28, and from the outer electrode 28 to the inner electrode 26. The inner insulating member 30 can represent the insulative gap 122 shown in FIGS. 1 through 3, and prevents the disk-shaped inner electrode 26 from being in contact with the ring-shaped outer electrode 28. Alternatively, the insulative gap 122 may be formed by spatial separation between the electrodes 26, 28, without the member 30 being present. Optionally, a portion of the member 30 may be disposed between the electrodes 26, 28 without the member 30 filling the entire space between the electrodes 26, 28.

The outer insulating ring-shaped member 32 is disposed against and around an outer diameter of the ring-shaped outer electrode 28. Optionally, the electrode assembly 16 may not include the outer member 32. The disk-shaped inner electrode 26, the ring-shaped outer electrode 28, and the insulating members 30 and 32 can be coupled with each other (e.g., by press-fit connections, adhesive, or the like) so that the electrodes 26, 28 and members 30, 32 rotate together. The electrodes 26, 28 can each be made of a conducting material which is chosen to be the conducting material in contact with the fluid 12. The electrodes 26, 28 may be made from any suitable material, including but not limited to the following examples of conductive materials, e.g., stainless steel, gold, silver, platinum, carbon, steel, etc. In one aspect, one or more of the electrodes 26, 28 is formed from the same material in which the fluid 12 is disposed when the fluid 12 is used in a machine.

The electrodes 26, 28 may be coupled with each other (e.g., by the inner insulating member 30) such that the electrodes 26, 28 move with each other. For example, in one embodiment, the electrodes 26, 28 may be coupled with each other such that the electrodes 26, 28 enter into the fluid 12 together, rotate at the same rotation speed while in the fluid 12, and are removed from the fluid 12 together. Additionally, while each of the electrodes 26, 28 shown in FIG. 7 represents a single conductive body, optionally, one or both of the electrodes 26, 28 may be formed from plural separate conductive bodies (e.g., rings, cylinders, dots, and the like).

Returning to the description of the embodiment of the system 10 shown in FIG. 6, the system 10 also includes a control device 18 that is used to operate the actuation device 20. The control device 18 can include or represent one or more hardware circuits or circuitry that includes or is coupled with one or more processors, controllers, or other logic-based computer devices. In one embodiment, the control device 18 represents a computer or computing device operating based off of instructions that are hard-wired into circuits (e.g., circuit boards) of the device 18. Optionally, the control device 18 may operate based off of instructions stored on a tangible and non-transitory computer readable storage device (e.g., a hard drive memory).

The control device 18 can be used by an operator of the system 10 to control the speed at which the actuation device 20 rotates the electrodes 26, 28 in the fluid 12. The control device 18 can include one or more input devices (e.g., knobs, switches, an electronic mouse, touchscreen, or the like) that are actuated by the operator to change the speed at which the actuation device 20 rotates the electrodes 26, 28. An electric energy sensing device 22 is conductively coupled with the electrodes 26, 28. The sensing device 22 includes one or more devices that measure the amounts of electric energy induced on the electrodes 26, 28 by movement of the fluid 12 and the electrodes 26, 28 relative to each other. For example, the sensing device 22 can include one or more voltmeters that measure an electric potential difference between the electrodes 26, 28 in an electric circuit that includes the electrodes 26, 28. This circuit may be open between the electrodes 26, 28. The sensing device 22 can measure the open circuit potential of this circuit between the electrodes 26, 28. For example, the sensing device 22 can measure a voltage of the fluid 12 at the plurality of locations (e.g., the electrodes 26, 28) of the rotating device 16 as the fluid 12 moves across the rotating device 16 in order to determine a streaming potential of the fluid 12 based on a difference in the measured voltage of the fluid 12 at the plurality of locations of the rotating device 16. The voltmeter 22 is configured to determine that the streaming potential of the fluid 12 is greater for larger differences in the measured voltage of the fluid 12 at the plurality of locations of the rotating device 16.

The sensing device 22 is configured to measure the streaming potential of the fluid 12 at each of the different rotation rates based on the difference in the measured voltage of the fluid 12 at the plurality of locations of the rotating device 16 at each of the different rotation rates. In one aspect, the different rotation rates each fall within a range of 0 to 10,000 revolutions per minute. In other aspects, different rotation rates may be used and can exceed 10,000 revolutions per minute. In still other aspects, the sensing device 22 may be configured to determine the streaming potential of the fluid 12 based on varying properties.

Figure 8:
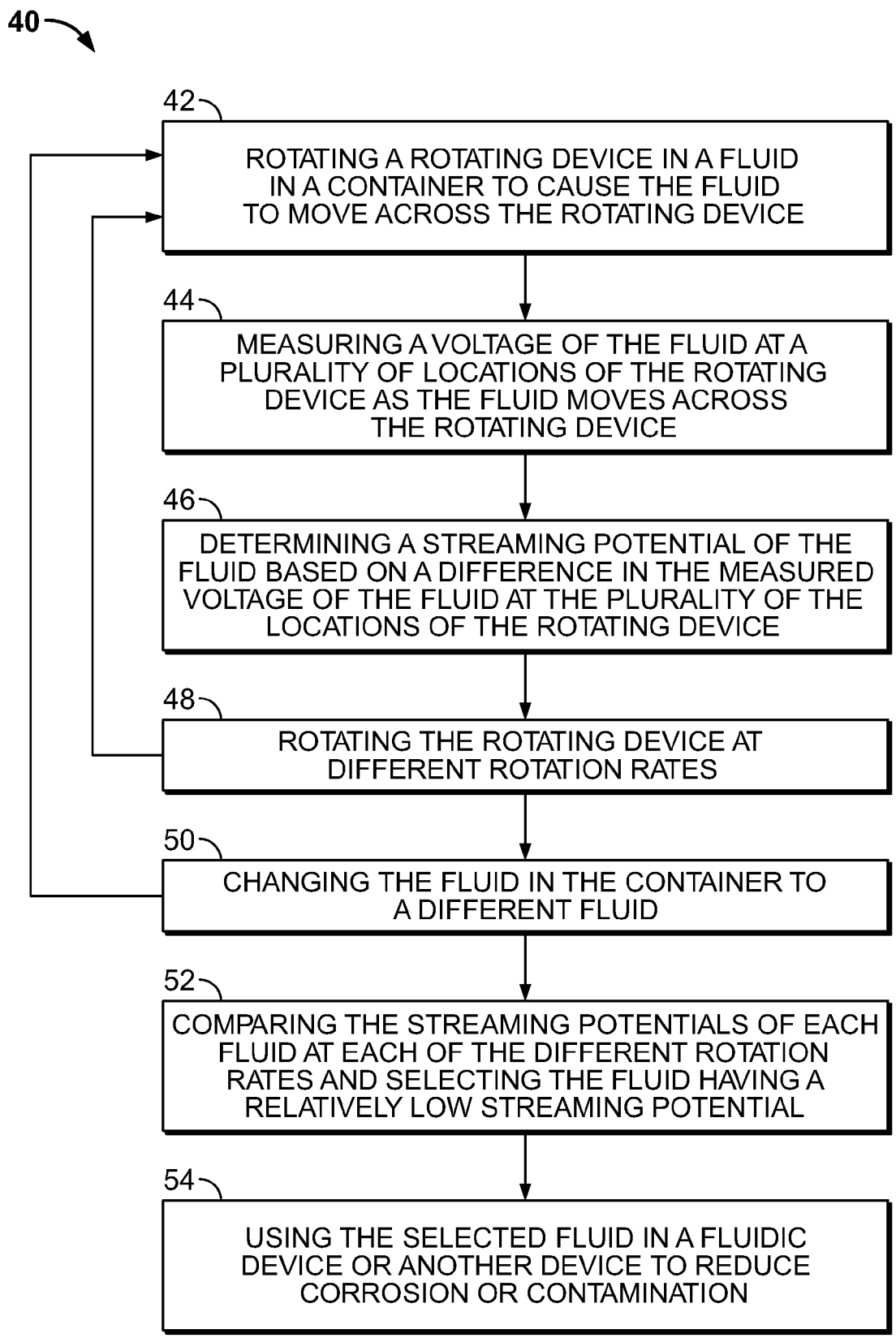
FIG. 8 is a flowchart illustrating one aspect of a method for testing a fluid.

FIG. 8 is a flowchart illustrating one aspect of a method 40 for testing a fluid. The method 40 may utilize the system 10 described above to characterize streaming potentials as a function of fluid velocity for one or more fluids 12. In other aspects, the method 40 may utilize another system. At 42, a rotating device is placed into and rotated in a fluid disposed in a container. This device includes plural conductive electrodes, such as the electrodes 26, 28. Rotation of the rotating device causes the fluid to move across the electrodes and induce potentials (e.g., voltages) on the electrodes. As described above, the rotating device may comprise a rotating ring-disk electrode comprising a disk-shaped inner electrode, a ring-shaped outer electrode, and an inner insulating gap (e.g., ring-shaped member).

At 44, a voltage of the fluid is measured at a plurality of locations of the rotating device as the fluid moves across the rotating device. For example, a voltmeter or other device can be used to measure the electric potentials at the electrodes 26, 28 as the electrodes 26, 28 are rotated together in the fluid 12. The speed at which the electrodes 26, 28 are rotated may be determined and associated with the measured potential difference.

At 46, a streaming potential of the fluid is determined based on a difference in the measured potentials of the fluid at the plurality of the locations of the rotating device. The difference in the measured potentials of the fluid at the locations (e.g., the electrodes 26, 28) represents the streaming potential of the fluid for the radial velocity of the fluid flowing across the electrodes 26, 28.

At 48, the speed at which the rotating device is rotated in the fluid may be changed. In one embodiment, flow of the method 40 may return to 42 so that the streaming potential of the fluid can be measured at this different rotation speed of the electrodes 26, 28. The streaming potential can be measured several times at different speeds of rotation of the electrodes 26, 28 in order to determine how the streaming potential of the fluid changes with respect to the velocity of the fluid across the electrodes 26, 28. For example, for the same fluid 12, the streaming potential of the fluid 12 may increase with increasing radial velocities of the fluid 12 across the electrodes 26, 28 and may decrease with decreasing radial velocities of the fluid 12 across the electrodes 26, 28. As described above, the fluid velocity may be derived from the speed at which the electrodes 26, 28 rotate in the fluid 12. The relationship between the measured streaming potential and the fluid velocities that are determined can be examined to obtain the streaming potential of the fluid 12 as a function of fluid velocity. In one aspect, the different rates at which the electrodes 26, 28 are rotated may fall within a range of 0 to 10,000 revolutions per minute. In other aspects, different rotation rates may be used.

In one embodiment, the streaming potential or potentials that are determined for the fluid may be used to determine whether the fluid needs to be changed or replaced. As described above, over time, the streaming potential of a fluid in a machine may increase, thereby indicating that the fluid is more prone to contamination or corrosion. The streaming potential of the fluid at one or more fluid velocities may be compared to one or more thresholds to determine if the streaming potential is too large and, as a result, the fluid needs to be replaced. If no further examination of the current fluid or another fluid is to be performed, the method 40 can terminate. Alternatively, the method 40 can continue, as described below.

At 50, the fluid in the container can be changed to a different fluid. The streaming potential of the different fluid can be measured for one or more rotation speeds of the electrodes, as described above in connection with 42 to 48, so that the streaming potential of the different fluid as a function of fluid velocity can be determined. The streaming potentials of additional fluids can be determined in a similar manner.

At 52, the streaming potentials of the fluids at one or more fluid velocities or rotation speeds are compared. In one aspect, the fluid is identified as having the lowest determined streaming potential or a streaming potential that is lower than one or more other fluids at the fastest fluid velocity, a fluid velocity that is faster than one or more other fluid velocities, the fastest rotation speed of the electrodes 26, 28, or the rotation speed of the electrodes 26, 28 that is faster than one or more other rotation speeds. This fluid may be less prone to contaminate or corrode a conductive body or container in which the fluid is disposed.

At 54, the selected fluid can be used inside a machine or other fluidic device. As described above, because this fluid has a relatively low streaming potential, the fluid may be less likely to contaminate or corrode the machine or device. In other aspects, any of the operations of the method 40 may be altered in substance or order, may not be followed, or one or more additional steps may be added.

In one embodiment, a method (e.g., for characterizing a fluid) includes rotating an electrode assembly in a fluid at a rotation speed. The electrode assembly includes first and second electrodes. Rotation of the electrode assembly draws at least a portion of the fluid to move across the first and second electrodes. The method also includes measuring a potential difference between the first and second electrodes as the at least a portion of the fluid moves across the first and second electrodes due to rotation of the electrode assembly, and determining a streaming potential of the fluid using the potential difference.

In one aspect, the method also includes determining the streaming potential of the fluid as a function of fluid velocity at which the fluid moves across the first and second electrodes.

In one aspect, the streaming potential of the fluid is determined as the function of fluid velocity by rotating the electrode assembly in the fluid at plural different rotation speeds, measuring plural different potential differences between the first and second electrodes at the corresponding plural different rotation speeds, determining plural different fluid velocities at which the fluid moves across the first and second electrodes when the electrode assembly is rotated at the corresponding different rotation speeds, and determining one or more streaming potentials of the fluid at the corresponding different fluid velocities.

In one aspect, the electrode assembly comprises the first electrode as an inner electrode and the second electrode as an outer electrode with the inner and outer electrodes separated by an insulative gap.

In one aspect, the method also includes rotating the electrode assembly in one or more additional fluids, measuring one or more additional potential differences between the first and second electrodes for the one or more additional fluids, determining one or more additional streaming potentials for the one or more additional fluids using the one or more additional potential differences, and selecting at least one of the fluid or the one or more additional fluids for use in a machine by comparing the streaming potential of the fluid and the one or more additional streaming potentials of the one or more additional fluids.

In one aspect, the potential difference that is measured represents an open circuit voltage between the first and second electrodes for an electronic circuit that includes the first and second electrodes.

In one aspect, rotating the electrode assembly causes both the first and second electrodes to be rotated at the rotation speed.

In one aspect, the fluid is a non-electrolyte solution or an aqueous solution. Optionally, the fluid can be an aqueous or non-aqueous solution (e.g., fluid) that does or does not include an electrolyte.

In one embodiment, a system (e.g., a measurement system for a fluid) includes an electrode assembly, an actuation device, and an electric energy sensing device. The electrode assembly includes a first electrode and a second electrode separated from each other by an insulative gap. The actuation device is configured to be coupled with the electrode assembly to rotate the electrode assembly in a fluid under examination. The electric energy sensing device is configured to be conductively coupled with the first and second electrodes of the electrode assembly. The electric energy sensing device also is configured to measure a potential difference between the first and second electrodes as the actuation device rotates the electrode assembly at a rotation speed to cause the fluid to move across the first and second electrodes. The potential difference that is measured is representative of a streaming potential of the fluid.

In one aspect, the actuation device is configured to rotate the electrode assembly in the fluid at plural different rotation speeds and the electric energy sensing device is configured to measure plural different potential differences between the first and second electrodes at the corresponding plural different rotation speeds. The different rotation speeds cause the fluid to move across the first and second electrodes at corresponding plural different fluid velocities. The streaming potential of the fluid can be determined as a function of the fluid velocities using the plural different potential differences and the plural different fluid velocities.

In one aspect, the electrode assembly includes the first electrode as an inner electrode and the second electrode as an outer electrode with the inner and outer electrodes separated by an insulative gap.

In one aspect, the inner electrode is a disk-shaped electrode, the insulative gap is a ring-shaped separation between the inner electrode and the outer electrode, and the outer electrode is a ring-shaped electrode.

In one aspect, the insulative gap of the electrode assembly includes a dielectric body disposed between the first and second electrodes.

In one aspect, electric energy sensing device is configured to measure the potential difference as an open circuit voltage between the first and second electrodes for an electronic circuit that includes the first and second electrodes.

In one aspect, the actuation device is configured to rotate the electrode assembly such that both the first and second electrodes are rotated at the rotation speed.

In one embodiment, a method (e.g., for examining a fluid) includes at least partially submerging first and second electrodes in a fluid. The first and second electrodes are separated from each other by an insulative gap. The method also includes rotating the first and second electrodes in the fluid at a common rotation speed. Rotation of the first and second electrodes at the common rotation speed causes the fluid to move across the first and second electrodes at a radial fluid velocity. The method also includes measuring a potential difference between the first and second electrodes as the fluid moves across the first and second electrodes at the radial fluid velocity, and determining a streaming potential of the fluid as a function of fluid velocity using the potential difference and the radial fluid velocity.

In one aspect, the first electrode is an inner disk-shaped electrode and the second electrode is an outer ring-shaped electrode that at least partially encircles an outer perimeter of the inner disk-shaped electrode. The inner disk-shaped electrode and the outer ring-shaped electrode are coupled with each other by a dielectric body such that rotation of the first and second electrodes causes the inner disk-shaped electrode and the outer ring-shaped electrode to both rotate around a common axis of rotation at the common rotation speed.

In one aspect, the streaming potential of the fluid is determined as the function of fluid velocity by rotating an electrode assembly that includes the first and second electrodes at plural different rotation speeds, measuring plural different potential differences between the first and second electrodes when the electrode assembly is rotated at the plural different rotation speeds, determining plural different fluid velocities at which the fluid moves across the first and second electrodes at the plural different rotation speeds, and determining plural different streaming potentials of the fluid at the plural different fluid velocities.

In one aspect, the fluid is a non-electrolyte solution or an aqueous solution. Optionally, the fluid can be an aqueous or non-aqueous solution (e.g., fluid) that does or does not include an electrolyte.

In one aspect, the method also includes determining one or more additional streaming potentials of one or more additional fluids as functions of fluid velocities of the one or more additional fluids, and selecting at least one of the fluid or the one or more additional fluids for use in a machine based on the corresponding streaming potential or one or more additional streaming potentials as functions of fluid velocities.

One or more of the operations described above in connection with the methods may be performed using one or more processors. The different devices in the systems described herein may represent one or more processors, and two or more of these devices may include at least one of the same processors. In one embodiment, the operations described herein may represent actions performed when one or more processors (e.g., of the devices described herein) are hardwired to perform the methods or portions of the methods described herein, and/or when the processors (e.g., of the devices described herein) operate according to one or more software programs that are written by one or more persons of ordinary skill in the art to perform the operations described in connection with the methods.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

The invention claimed is:

1. A method comprising:
  rotating an electrode assembly comprising a disk-shaped electrode and a ring-shaped electrode submerged in a fluid at a rotation speed, the electrode assembly comprising the disk-shaped electrode and the ring-shaped electrode that encircles the disk-shaped electrode around an outer perimeter of the disk-shaped electrode, wherein rotation of the electrode assembly draws at least a portion of the fluid to move across the disk-shaped electrode and the ring-shaped electrode;

measuring a potential difference between the disk-shaped electrode and the ring electrode as the at least a portion of the fluid moves across the disk-shaped electrode and the ring-shaped electrode due to rotation of the electrode assembly; and determining a streaming potential of the fluid using the potential difference.

2. The method of claim 1, further comprising determining the streaming potential of the fluid as a function of fluid velocity at which the fluid moves across the disk-shaped electrode and the ring-shaped electrode.

3. The method of claim 2, wherein the streaming potential of the fluid is determined as the function of fluid velocity by rotating the electrode assembly in the fluid at plural different rotation speeds, measuring plural different potential differences between the disk-shaped electrode and the ring-shaped electrode at the plural different rotation speeds, determining plural different fluid velocities at which the fluid moves across the disk-shaped electrode and the ring-shaped electrode when the electrode assembly is rotated at the corresponding different rotation speeds, and determining one or more streaming potentials of the fluid at the corresponding different fluid velocities.

4. The method of claim 1, wherein the electrode assembly comprises the disk-shaped electrode and the ring-shaped electrode separated from each other by an insulative gap.

5. The method of claim 1, further comprising rotating the electrode assembly in one or more additional fluids, measuring one or more additional potential differences between the disk-shaped electrode and the ring-shaped electrode for the one or more additional fluids, determining one or more additional streaming potentials for the one or more additional fluids using the one or more additional potential differences, and selecting at least one of the fluid or the one or more additional fluids for use in a machine by comparing the streaming potential of the fluid and the one or more additional streaming potentials of the one or more additional fluids.

6. The method of claim 1, wherein the potential difference that is measured represents an open circuit voltage between the disk-shaped electrode and the ring-shaped electrode for an electronic circuit that includes the disk-shaped electrode and the ring-shaped electrode.

7. The method of claim 1, wherein rotating the electrode assembly causes both the disk-shaped electrode and the ring-shaped electrode to be rotated at the rotation speed.

8. The method of claim 1, wherein the fluid is a non-electrolyte solution or an aqueous solution.

9. A system comprising:
an electrode assembly comprising a disk-shaped electrode and a ring-shaped electrode separated from each other by an insulative gap, the ring-shaped electrode encircling an outer perimeter of the disk-shaped electrode;
an actuation device configured to be coupled with the electrode assembly to rotate the disk-shaped electrode and the ring-shaped electrode in a fluid under examination while the disk-shaped electrode and the ring-shaped electrode are submerged in the fluid; and
an electric energy sensing device configured to be conductively coupled with the disk-shaped electrode and the ring-shaped electrode of the electrode assembly, the electric energy sensing device configured to measure a potential difference between the disk-shaped electrode and the ring-shaped electrode as the actuation device rotates the electrode assembly at a rotation speed to cause the fluid to move across the disk-shaped electrode and the ring-shaped electrode, wherein the potential difference that is measured is representative of a streaming potential of the fluid.

10. The system of claim 9, wherein the actuation device is configured to rotate the electrode assembly in the fluid at plural different rotation speeds and the electric energy sensing device is configured to measure plural different potential differences between the disk-shaped electrode and the ring-shaped electrode at the corresponding plural different rotation speeds, wherein the different rotation speeds cause the fluid to move across the disk-shaped electrode and the ring-shaped electrode at corresponding plural different fluid velocities, and wherein the streaming potential of the fluid can be determined as a function of the fluid velocities using the plural different potential differences and the plural different fluid velocities.

11. The system of claim 9, wherein the electrode assembly comprises the disk-shaped electrode and the ring-shaped electrode separated from each other by an insulative gap.

12. The system of claim 11, wherein the insulative gap is a ring-shaped separation between the disk-shaped electrode and the ring-shaped electrode.

13. The system of claim 9, wherein the insulative gap of the electrode assembly includes a dielectric body disposed between the disk-shaped electrode and the ring-shaped electrode.

14. The system of claim 9, wherein electric energy sensing device is configured to measure the potential difference as an open circuit voltage between the disk-shaped electrode and the ring-shaped electrode for an electronic circuit that includes the disk-shaped electrode and the ring-shaped electrode.

15. The system of claim 9, wherein the actuation device is configured to rotate the electrode assembly such that both the disk-shaped electrode and the ring-shaped electrode are rotated at the rotation speed.

16. A method comprising:
at least partially submerging a disk-shaped electrode and a ring-shaped electrode in a fluid, the disk-shaped electrode and ring-shaped electrode separated from each other by a ring-shaped insulative gap with the ring-shaped electrode encircling an outer perimeter of the disk-shaped electrode;
rotating the disk-shaped electrode and the ring-shaped electrode in the fluid at a common rotation speed, wherein rotation of the disk-shaped electrode and the ring-shaped electrode at the common rotation speed causes the fluid to move across the disk-shaped electrode and the ring-shaped electrode at a radial fluid velocity;
measuring a potential difference between the disk-shaped electrode and the ring-shaped electrode as the fluid moves across the disk-shaped electrode and the ring-shaped electrode at the radial fluid velocity; and
determining a streaming potential of the fluid as a function of fluid velocity using the potential difference and the radial fluid velocity.

17. The method of claim 16, wherein the disk-shaped electrode and the ring-shaped electrode are coupled with each other by a dielectric body such that rotation of the disk-shaped electrode and the ring-shaped electrode causes the disk-shaped electrode and the ring-shaped electrode to both rotate around a common axis of rotation at the common rotation speed.

18. The method of claim 16, wherein the streaming potential of the fluid is determined as the function of fluid velocity by rotating an electrode assembly that includes the disk-shaped electrode and the ring-shaped electrode at plural different rotation speeds, measuring plural different potential differences between the disk-shaped electrode and the ring-shaped electrode when the electrode assembly is rotated at the plural different rotation speeds, determining plural different fluid velocities at which the fluid moves across the disk-shaped electrode and the ring-shaped electrode at the plural different rotation speeds, and determining plural different streaming potentials of the fluid at the plural different fluid velocities.

19. The method of claim 16, wherein the fluid is a non-electrolyte solution or an aqueous solution.

20. The method of claim 16, further comprising determining one or more additional streaming potentials of one or more additional fluids as functions of fluid velocities of the one or more additional fluids, and selecting at least one of the fluid or the one or more additional fluids for use in a machine based on the streaming potential or one or more additional streaming potentials as functions of fluid velocities.

* * * * *